Oct. 26, 1954

L. B. GREEN 2,692,633

WORK GRIPPING CHUCK MECHANISM

Original Filed Aug. 20, 1952

INVENTOR.
LEE B. GREEN
BY Hudson, Doughton,
Williams, David & Hoffmann
ATTORNEYS Oct. 26, 1954

L. B. GREEN 2,692,633

WORK GRIPPING CHUCK MECHANISM

Original Filed Aug. 20, 1952

INVENTOR.
LEE B. GREEN
BY Hudson, Boughton
Williams, David & Hoffmann
ATTORNEYS

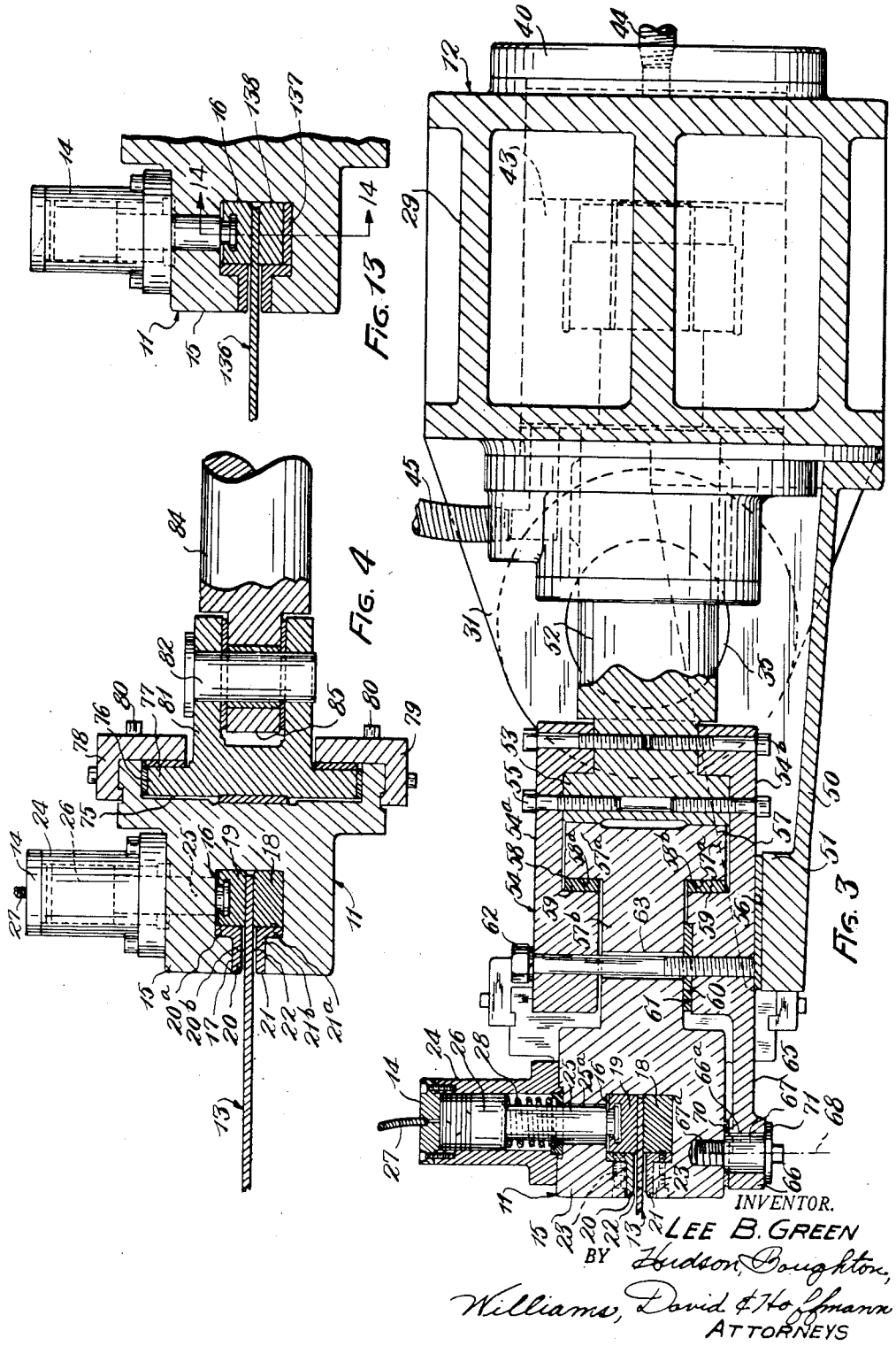

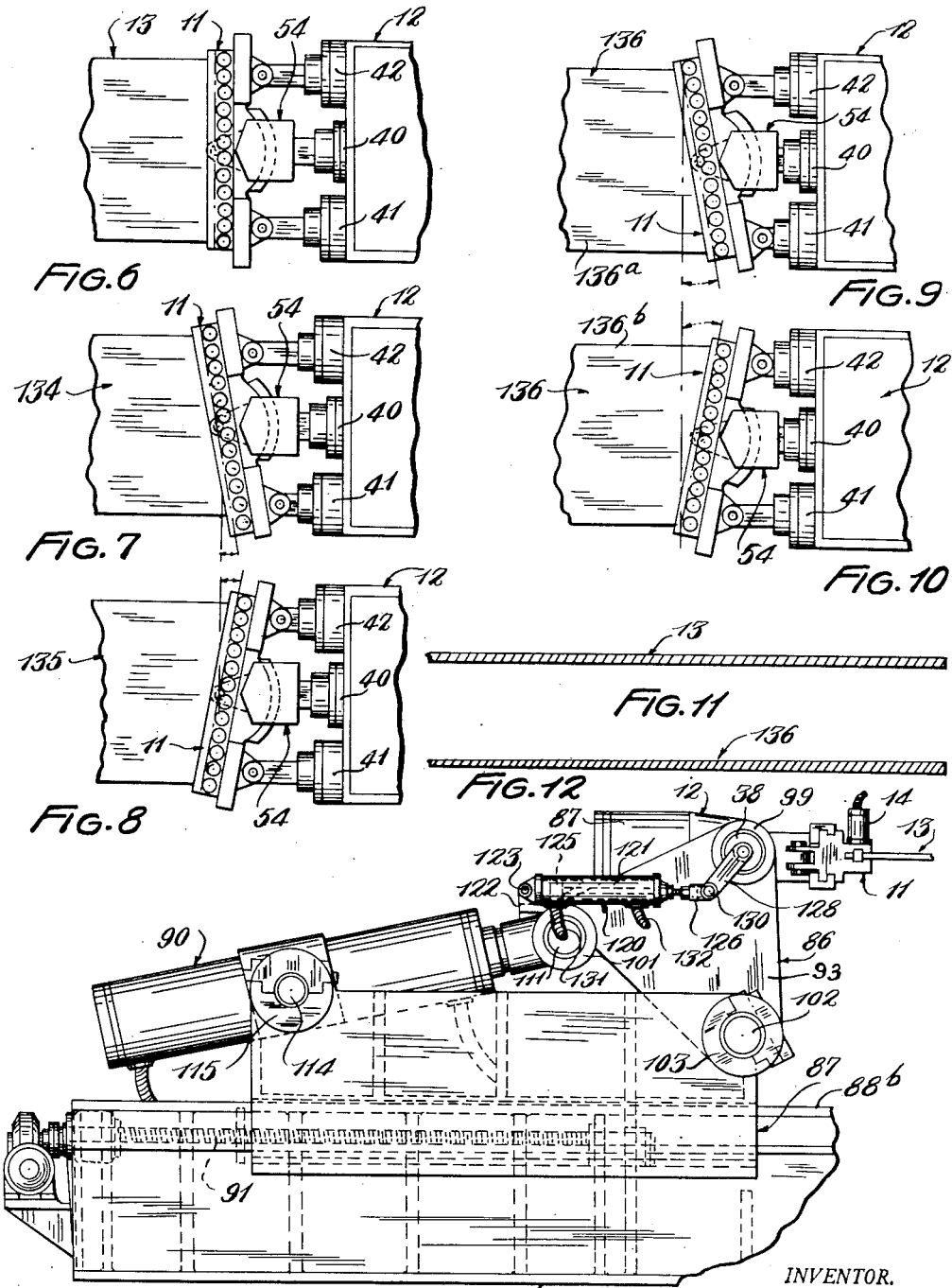

Patented Oct. 26, 1954

2,692,633

UNITED STATES PATENT OFFICE 2,692,633

WORK GRIPPING CHUCK MECHANISM

Lee B. Green, Lakewood, Ohio

Original application August 20, 1952, Serial No. 305,377. Divided and this application October 28, 1952, Serial No. 317,302

13 Claims. (Cl. 153—48)

This invention relates to chuck mechanisms and, more particularly, to a novel chuck mechanism of the type having a movable grip head provided with gripping means for engagement with a work member.

In original application Serial No. 305,377, filed August 20, 1952, this novel chuck mechanism is disclosed as forming a part of a stretch bending machine which carries out combined stretching and bending operations on metal members. The novel chuck mechanism is especially applicable to a work member in the form of a metal sheet to be stretch-formed and is described here in conjunction with a work member of that kind, but without any intention of limiting the novel chuck mechanism solely to that form of work member and operation thereon since it is also applicable to various other forms of work members and operations to be carried out.

An object of this invention is to provide a novel chuck mechanism in which a grip head having gripping means thereon is supported by a carrier member for movement with, and also movement relative to, such carrier member and in which the movement of the grip head relative to the carrier member is produced by power means located on the carrier member.

Another object is to provide novel chuck mechanism of the character mentioned in which the movement of the grip head relative to the carrier member can be either a translatory movement or a tilting movement or a combination of such translatory and tilting movements.

A further object is to provide novel chuck mechanism of the kind above referred to in which the relative translatory movement of the grip head is produced by a main power means on the carrier member and the relative tilting of the grip head is produced by power devices located on the carrier member on opposite sides of the main power means.

Still another object is to provide novel chuck mechanism of the character indicated above in which the carrier member has a projection thereon provided with bearing means and in which the grip head is supported by such projection, preferably by yoke means which is slidable on such bearing means.

Yet another object is to provide novel chuck mechanism of this kind in which the grip head is tiltable relative to the yoke means and about a pivot axis, and in which cooperating arcuate bearing head and arcuate bearing shoulder means form a force-transmitting connection with the grip head and permit the tilting of the grip head about such pivot means.

It is also an object of this invention to provide novel chuck mechanism of the character mentioned above in which the carrier member is mounted for swinging movement in a rocker member which, in turn, is mounted for rocking movement relative to a supporting means, preferably a supporting means in the form of a reciprocably movable carriage means.

This invention also provides novel chuck mechanism of the kind having a grip head provided with a recess containing a gripping means and a guide slot communicating with such recess, and in which the guide slot is defined by spaced portions of hardened wear-resistant inserts of angular cross-sectional shape mounted on the grip head.

Additionally, this invention provides novel chuck mechanism of the kind having an elongated grip head provided with a longitudinal recess and intended for gripping work sheets of tapered thickness, and in which gripping means in the recess includes a grip strip and a tapered filler strip located under the grip strip and whose taper is in a reverse arrangement relative to the taper of the work sheet, the filler strip preferably being a segment cut from the tapered work sheet.

The invention can be further briefly summarized as consisting in certain novel combinations and arrangements of parts hereinafter described and particularly set out in the claims hereof.

In the accompanying sheets of drawings forming a part hereof:

Fig. 3 is a longitudinal vertical section through the chuck mechanism taken on section line 3—3 of Fig. 1;

Fig. 4 is a partial longitudinal vertical section taken through the chuck mechanism on section line 4—4 of Fig. 1;

Fig. 5 is a partial rear elevation of the chuck mechanism;

Fig. 6 is a partial plan view of a somewhat diagrammatic form showing the chuck mechanism gripping a square-end work sheet;

Fig. 7 is a similar plan view, but showing the grip head tilted to one of its angular positions and gripping a bevel-end work sheet;

Fig. 8 is a plan view similar to Fig. 7, but showing the gripping head tilted to another of its angular positions and gripping an oppositely beveled work sheet;

Fig. 9 is a plan view similar to Fig. 6, but showing the angular position of the grip head as resulting from an actuation of the chuck mechanism by which an increased amount of stretching has been produced in one edge portion of the work sheet;

Fig. 10 is a plan view similar to Fig. 9, but showing the increased-stretch condition reversed with respect to the edge portions of the work sheet;

Fig. 11 is a transverse section taken through a work sheet of a substantially uniform thickness thereacross;

Fig. 12 is a similar transverse section, but showing a work sheet having a tapered thickness;

Fig. 13 is a fragmentary vertical section taken through the grip head and showing the chuck mechanism adapted for gripping the tapered thickness work sheet of Fig. 12;

Figure 1:
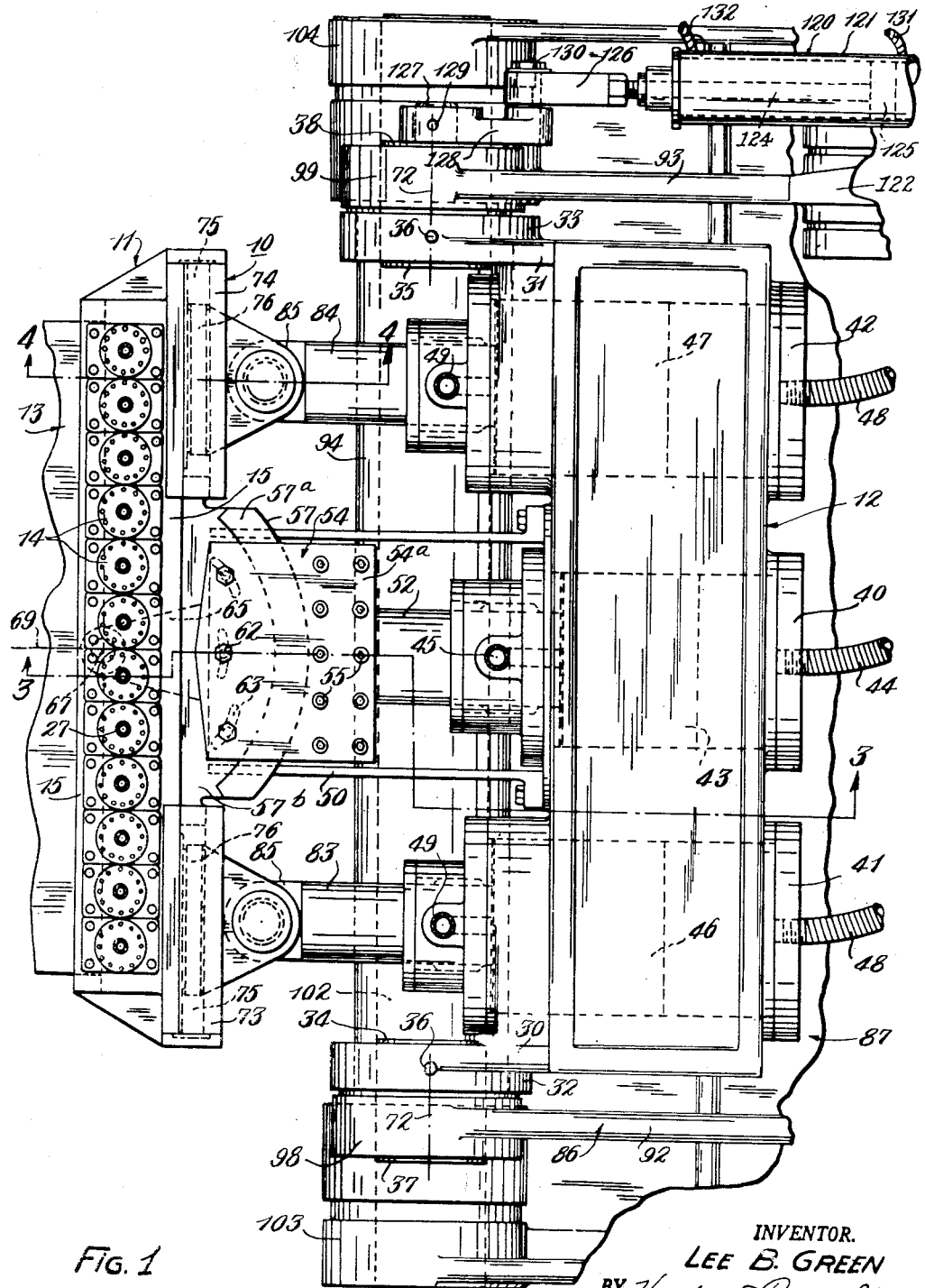
Fig. 1 is a plan view showing chuck mechanism embodying the present invention.
Figure 2:
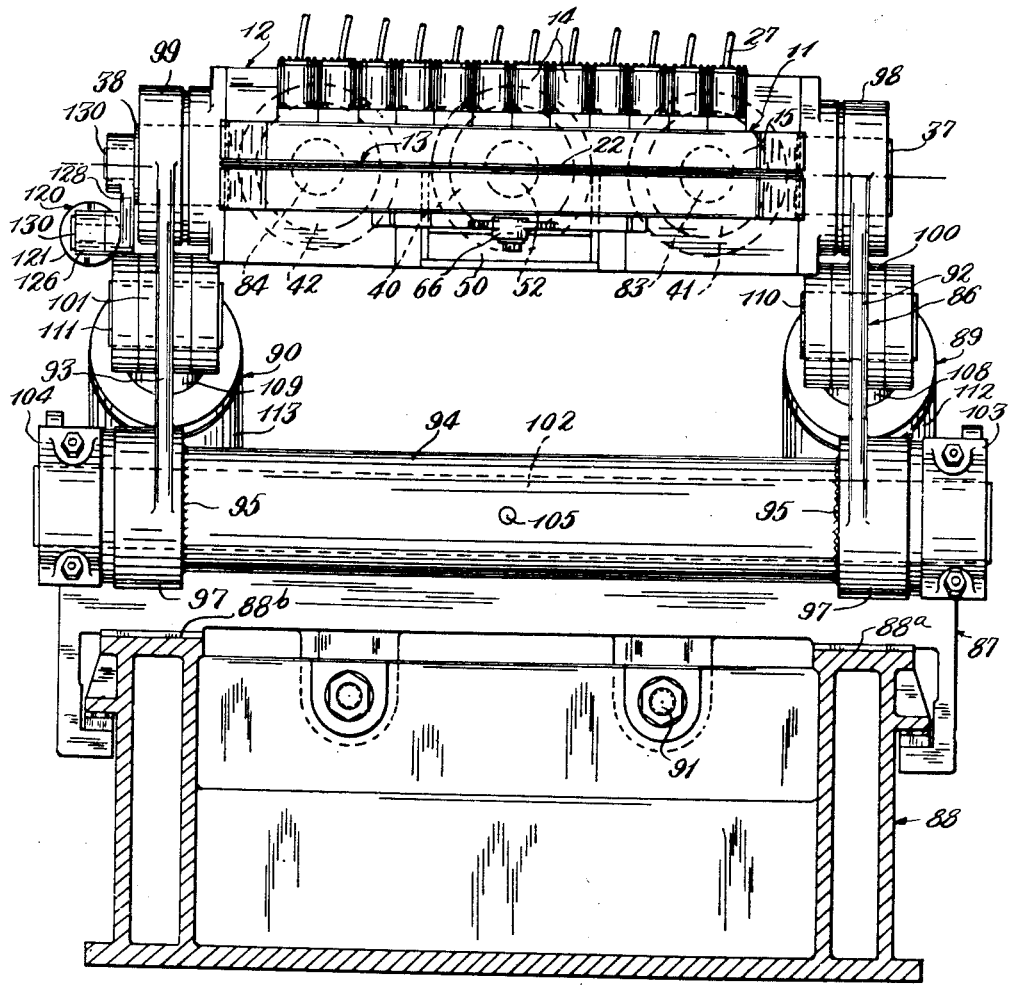
Fig. 2 is an end view of the chuck mechanism showing the same mainly in elevation but with certain portions in transverse vertical section.

As one practical embodiment of the present invention, the drawings show the novel chuck mechanism 10 as comprising in general a grip head 11 and a carrier member 12 for supporting and manipulating the grip head. The grip head 11 is shown in gripping engagement with a work member 13, which, in this instance, is a metal sheet which is hereinafter referred to as the work sheet. The grip head 11 is elongated in the transverse direction of the work sheet and is provided with a number of work-gripping chucks 14 distributed therealong for gripping engagement with the work sheet at correspondingly spaced points thereacross.

The grip head 11 further comprises a laterally elongated rigid bar 15 having a laterally extending dovetail recess 16 therein to which the end or edge portion of the work sheet 13 is admitted through an access slot 17. The gripping jaws of the grip head 11 are formed by a laterally extending grip strip 18 of hardened metal seated in the lower portion of the dovetail recess 16 and a laterally extending row of individual grip blocks 19 located in the upper portion of the dovetail recess and movable toward and away from the grip strip for clamping the intervening end or edge portion of the work sheet 13 against the latter. A pair of hardened guide strips 20 and 21, of an angular cross-sectional shape, are located in the access slot 17 of the bar 15 and define a guide slot 22 therebetween by which the end portion of the work sheet is guided into position between the lower grip strip 18 and the grip blocks 19.

The angular guide strips 20 and 21 are disposed with the vertical legs 20$^a$ and 21$^a$ thereof lying in the recess 16 and the parallel legs 20$^b$ and 21$^b$ thereof lying in the access slot 17 of the bar 15. These guide strips can be secured in place by suitable screws 23.

The grip blocks 19 of the grip head 11 constitute portions of the individual chucks 14 and one of the grip blocks 19 is associated with each of the chuck cylinders 24 and is carried and actuated by the lower end of a piston rod 25 projecting from such cylinder. The cylinders 24 are mounted on and secured to the upper surface of the bar 15 with the piston rods 25 extending through openings 25$^a$ of this bar into the dovetail recess 16. A piston 26 located in each of the chuck cylinders 24 is connected with the upper end of the piston rod 25 and has a downward power stroke in response to pressure fluid supplied through a flexible conduit 27 for moving the associated grip block 19 toward the grip strip 18 for clamping the work sheet 13 therebetween. A compression spring 28 provided in each of the chuck cylinders 24 and located beneath the piston 26, produces an upward return stroke of the latter and a release movement of the grip block 19 away from the grip strip 18.

The carrier member 12 of the chuck mechanism 10 comprises a block-like rigid body 29 having a pair of laterally spaced front and rear arms 30 and 31 integrally connected therewith and projecting therefrom in the direction of the longitudinal axis of the work sheet 13 and toward the grip head 11. The arms 30 and 31 are provided at their free ends with bosses 32 and 33 in which transversely projecting front and rear pivot pins 34 and 35 are mounted and secured by means of anchor pins 36. The portions of the pivot pins 34 and 35 which project from the arms 30 and 31 define trunnions 37 and 38.

The carrier member 12 is constructed so as to embody a plurality of laterally spaced fluid pressure cylinders, in this instance three such cylinders, comprising a center cylinder 40 and a pair of side cylinders 41 and 42 disposed on opposite sides of the center cylinder. The center cylinder 40 is a double acting cylinder having a piston 43 operable therein in response to pressure fluid supplied to opposite ends of this cylinder through flexible conduits 44 and 45. The side cylinders 41 and 42 are, likewise, double acting cylinders having pistons 46 and 47 operable therein in response to pressure fluid supplied to opposite ends of these cylinders through flexible conduits 48 and 49.

The grip head 11 is connected with the carrier member 12 for actuation therefrom, as will now be described. For this purpose, the carrier member 12 is provided with a projecting bracket 50 extending toward the grip head 11 and having a bearing pad 51 thereon. A piston rod 52 connected with the piston 43 projects from the center cylinder 40 in overlying relation to the bracket 50 and is provided at the end thereof with a substantially T-shaped head 53. A yoke 54 is connected with the piston rod 52 and is formed by a pair of complemental upper and lower yoke members 54$^a$ and 54$^b$ which are secured to the head 53 of the piston rod by means of the screws 55. The yoke 54 is supported and guided by the bracket 50 by a sliding engagement of the flat bearing surface 56 of the lower yoke member 54$^b$ on the bearing pad 51.

The bar 15 of the grip head 11 is provided, at an intermediate point thereof and on the side thereof opposite the access slot 17, with a projecting substantially T-shaped bearing head 57. The yoke 54 is provided with a substantially T-shaped bearing pocket 58 in which the bearing head 57 engages for establishing a supporting and operating connection between the grip head 11 and the carrier member 12. The T-shaped bearing head 57 comprises a curved head portion 57$^a$ and a web portion 57$^b$ forming a connecting stem between the head 57 and the bar 15. The upper and lower yoke members 54$^a$ and 54$^b$ are provided with curved internal bearing surfaces 58$^a$ and 58$^b$ formed by inserts 59 of antifriction material and against which the curved head portion 57$^a$ has bearing engagement. The lower yoke member 54$^b$ is also provided with a flat antifriction bearing insert 60 on which the flat lower bearing surface 61 of the web portion 57ᵇ has rockable bearing engagement.

The upper and lower yoke members 54ª and 54ᵇ are connected together by means of screws 62 which extend through arcuate clearance slots 63 in the web portion 57ᵇ of the bearing head 57. The lower yoke member 54ᵇ is also provided with an arm projection 65 which extends into a position beneath the bar 15 and is provided at the end thereof with a boss or eye 66 having a pivot opening 66ª therein. A pivot pin 67 is connected with the bar 15 by means of a threaded pin portion 67ª and extends in depending relation to the bar and engages in the pivot opening 66ª on a vertical axis 68 which intersects the central longitudinal axis 69 of the work sheet 13.

The location of the pivot pin 67 is such that the axis 68 also intersects the work sheet 13 at the inner end of the guide slot 22 or, in other words, at the point where the work sheet emerges from between the grip elements 18 and 19 of the grip head 11. The bar 15 has bearing engagement with the boss 66 of the projecting arm 65 through an intervening washer 70 located on the pivot pin 67. The bar 15 is also confined, with respect to the arm 65, by means of a second washer or head 71 provided on the pivot pin 67 and engaging the underside of the boss 66.

From the construction just described above for the supporting and operating connection for the grip head 11, it will be seen that the yoke 54 and the T-shaped bearing head 57 form a swivel connection between the grip head and the piston rod 52, such that the grip head will be capable of tilting substantially in the plane of the work sheet 13 and relative to the common pivot axis 72 of the trunnions 37 and 38 of the carrier member 12. By reason of the substantially T shape of the curved bearing head 57 and its engagement in the curved T-shaped bearing pocket 58 of the yoke 54, the operating connection between the grip head 11 and the carrier member 12 also provides for the transmission of a heavy pulling force between the carrier member and the grip head for application to the work sheet 13 by the latter as a stretching force.

It will also be seen that in this supporting and operating connection between the grip head 11 and the carrier member 12, the swiveling or tilting movement of the grip head relative to the carrier member takes place by a swinging of the grip head about the axis 68 of the pivot pin 67 and by a sliding of the curved head portions 57ª of the bearing head 57 in the curved transverse slot portion of the pocket 58 of the yoke 54. These cooperating arcuate bearing portions 57ª, 58ª and 58ᵇ lie on an arc having its center on the pivot axis 68. The pivot pin 67 of the grip head 11 engages in the pivot opening 66ª of the boss 66 with a sufficiently loose fit so that the strong pulling forces, which are applied to the grip head, will be transmitted through the T-shaped bearing head 57 rather than through this pivot pin.

In addition to the T-shaped bearing head 57, the bar 15 is also provided with a pair of front and rear side bearing members 73 and 74 located on opposite sides of the bearing head 57. The side bearing members 73 and 74 form flexible operating connections between the grip head 11 and the front and rear cylinder devices 41 and 42 of the carrier member 12. As shown in Figs. 1 and 4, each of the side bearing members 73 and 74 comprises a substantially channel-shaped guideway 75 extending longitudinally of the bar 15 and a bearing member 76 having a T-shaped head 77 slidable in such guideway and retained therein by a pair of gibs 78 and 79 of an angular cross-sectional shape and secured to the bar 15 by screws 80. The bearing member 76 is provided with a forked rear portion 81 carrying a pivot pin 82.

Piston rods 83 and 84, connected with the pistons 46 and 47 of the cylinder devices 41 and 42, extend in substantially parallel relation to the piston rod 52 of the main or central cylinder 40. Each of the piston rods 83 and 84 is provided at the end thereof with an eye 85 which extends into the yoke opening of the forked bearing portion 81 and is pivotally secured to the latter by the pivot pin 82.

The chuck mechanism 10 also comprises a rocker member 86 on which the carrier member 12 is mounted for swinging movement in a vertical plane and about the common transverse pivot axis 72 of the trunnions 37 and 38. The rocker member 86 is, in turn, pivotally mounted on a reciprocably movable carriage 87 which is slidable on a frame or base 88. The chuck mechanism 10 additionally includes a pair of cylinder devices 89 and 90 mounted on the carriage 87 and operably connected with the rocker member 86 for imparting the rocking movement to the latter. The carriage 87 is movable on guideways 88ª and 88ᵇ of the frame 88 by suitably actuated rotatable lead screws 91.

The rocker member 86 comprises a pair of laterally spaced front and rear upright links or brackets 92 and 93, which are here shown as being formed by substantially triangular plate members, and a transverse sleeve 94 to the ends of which the links 92 and 93 are rigidly connected as by means of the welds 95. At the point of connection of the links 92 and 93 with the sleeve 94, the links are provided with bosses 96 and 97 which are located adjacent the lower corner or apex of the links.

As shown in the drawings the rocker member 86 also comprises a pair of front and rear bearing bosses 98 and 99 provided on the links 92 and 93 at one of the upper corners thereof and a second pair of front and rear bearing bosses 100 and 101 located at the other of the upper corners of the triangular links. The carrier member 12 is pivotally mounted in the rocker member 86 by having the trunnions 37 and 38 thereof journaled in the bearing bosses 98 and 99, such that the carrier member is swingable in the rocker member between the links 92 and 93 thereof.

The rocker member 86 is mounted on the carriage 87 by means of a transverse rockshaft 102 extending through the sleeve 94 and whose ends project from this sleeve through the bearing bosses 96 and 97 and are journaled in a pair of front and rear bearings 103 and 104 provided on the carriage. The rockshaft 102 is preferably secured in the sleeve 94, as by means of a transverse pin 105. The rocking movement of the rocker member 86 about the axis of the rockshaft 102, is produced by the power cylinder devices 89 and 90 which have piston rods 108 and 109 projecting therefrom and pivotally connected with the bearing bosses 100 and 101 by means of transverse front and rear pivot pins 110 and 111.

The cylinders 112 and 113 of the cylinder devices 89 and 90 are pivotally mounted on the carriage 87 at a point spaced from the rockshaft 102, by means of pairs of trunnions 114 connected with the cylinders and journaled in pairs of bearing bosses 115 provided on the carriage. The cylinders 112 and 113 are double-acting cylinders and have suitable pressure fluid supply and exhaust connections adjacent opposite ends thereof. Since the rocker member 86 and the cylinder devices 89 and 90 are mounted on the carriage 87 as just described above, they are movable therewith along the guideways 88ª and 88ᵇ of the frame 88.

Figure 15:
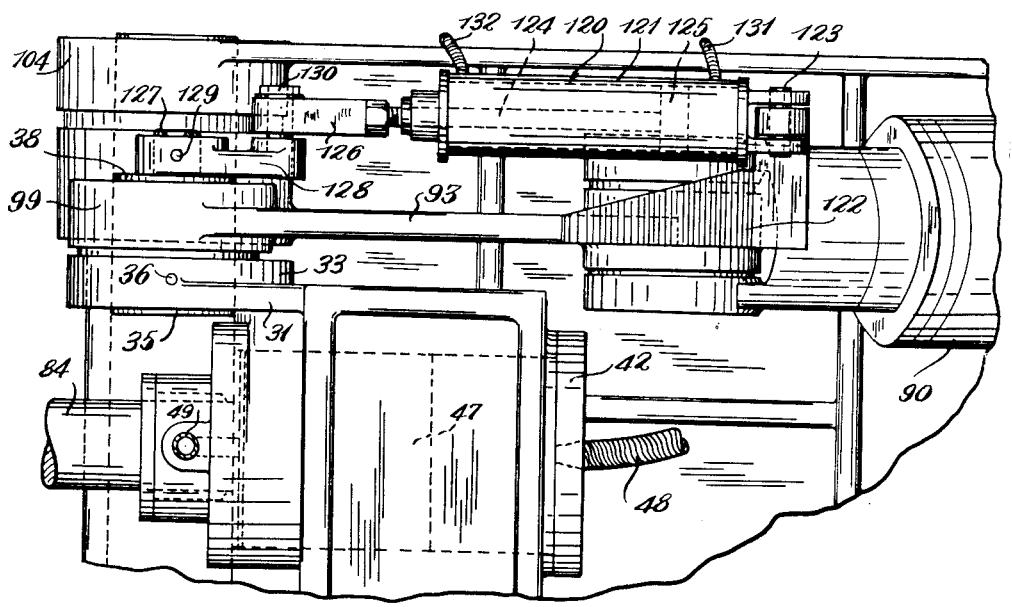
Fig. 15 is a fragmentary plan view showing the mounting of an auxiliary cylinder device of the chuck mechanism.
Figure 14:
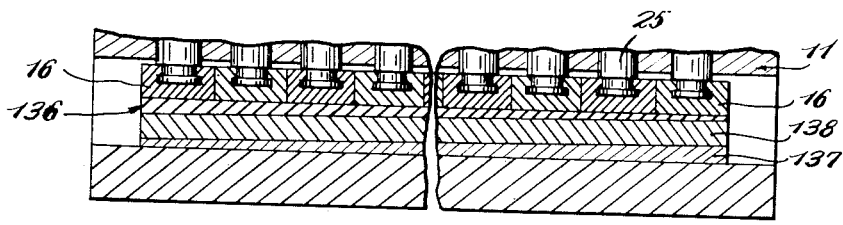
Fig. 14 is a partial longitudinal section taken through the grip head of Fig. 13, as indicated by the section line 14—14 thereof.

Swinging of the carrier member 12 in the rocker member 86 is, at times, produced by a reaction force transmitted thereto from the work sheet 13 through the grip head 11 as is more fully explained in said original application. Swinging of the carrier member 12 in the rocker member 86 is also produced, at times, by an auxiliary power cylinder device 120 having the cylinder 121 thereof mounted on the rear link 93 of the rocker member by means of a bracket 122 (see Fig. 15). One end of the cylinder 121 is pivotally connected with the bracket 122 by means of the pivot pin 123. The cylinder device 120 includes a piston rod 124 which is connected with the piston 125 and is provided at its outer end with a yoke 126.

The rear trunnion 38 of the carrier member 12 is provided with a reduced axial extension 127 to which a lever or crank arm 128 is secured by means of a transverse key or pin 129. The crank arm 128 carries a crank pin 130 with which the yoke 126 is pivotally connected. Since one end of the cylinder device 120 is attached to the rocker member 86 by the bracket 122 and the other end is connected with the carrier member 12 through the crank arm 128, it will be seen that actuation of this cylinder device by pressure fluid supplied thereto, will produce swinging of the carrier member in the rocker member 86 either upwardly or downwardly depending upon the particular end of the cylinder 121 to which the pressure fluid is supplied through one or the other of the flexible conduits 131 and 132. This upward and downward swinging of the carrier 12 by the cylinder device 120 is, of course, apart from the swinging of the carrier produced by the movement of the rocker member 86.

The grip head 11 can be advanced into engagement with the work sheet 13 by movement of the carriage 87 along the frame 88, or by a rocking of the rocker member 86 on the carriage, or by a combination of these movements. The grip head can also be advanced into engagement with the work sheet 13 by a translatory movement of the grip head relative to the carrier member 12 produced by actuation of the power cylinder devices 40, 41 and 42 of the carrier member. The advance movement of the grip head 11 by the cylinder devices of the carrier member 12 can, if desired, be the final portion of an initial or major advance movement produced by the movement of the rocker member 86 and the carriage 87.

In order to bring the guide slot 22 of the grip head 11 into proper registering relation to receive the work sheet 13, the grip head can also be swung vertically by a swinging of the carrier member 12 about the trunnion axis 72 produced by actuation of the auxiliary power cylinder device 120. It will therefore be understood that the positioning of the grip head 11 for engagement with the work sheet 13, can be produced by any desired combination of the above-described movements consisting of reciprocation of the carriage 87, rocking of the rocker member 86, swinging of the carrier member 12 and translatory movement of the grip head relative to the trunnion axis 72.

In the drawings the work sheet 13 is shown as having a square end and the diagrammatic view of Fig. 6 illustrates the engagement of the grip head 11 with such square end by a translatory movement of the grip head relative to the carrier member 12 produced by the above-mentioned actuation of the power cylinder devices 40, 41 and 42 of the carrier member.

Figs. 7 and 8 show work sheets 134 and 135 having beveled ends and also show the tilting of the grip head 11 relative to the carrier member 12 by actuation of the power cylinder devices 40, 41 and 42 for engaging the grip head with such beveled ends of these work sheets. In Fig. 7, the end of the work sheet 134 is beveled in one direction and requires a corresponding tilting of the grip head by the cylinder devices 41 and 42, and in Fig. 8 the end of the work sheet 135 is beveled in the opposite direction and requires a tilting of the grip head in such opposite direction by the cylinder devices 41 and 42.

In addition to gripping the work sheet 13, the chuck mechanism 10 serves to transmit pulling and stretching forces to the work sheet for the purpose of tensioning or stretching the latter when it is desirable to do so, as for example, during a stretch bending operation being carried out by the stretch bender disclosed in said original application. The chuck mechanism 10 transmits or applies such pulling and stretching forces to the work sheet during a swinging of the carrier member 12 caused by a rocking of the rocker member 86 by the cylinder devices 89 and 90. These pulling and stretching forces are also produced, at times, by movement of the carriage 87 on the frame 88 by the lead screws 91, or by a combination of such movements of the rocker member and carriage. The pulling and stretching forces applied to the work sheet 13 by the grip head 11 are also produced, at times, by the actuation of the power cylinder devices 40, 41 and 42 of the carrier member 12 so as to cause either a translatory movement or a tilting movement of the grip head relative to the carrier member, or a movement of the grip head relative to the carrier member which consists of a combination of such translatory and tilting movements.

The pulling and stretching forces which are applied to the work sheet 13 through the grip head 11, can be produced initially and for the major portion of the pulling or stretching operation, by the above-described movement of the carriage 87 on the frame 88 and rocking of the rocker member 86 about the axis of the rockshaft 102, and the completion of the pulling or stretching operation can be accomplished by the pulling or stretching forces produced by the cylinder devices 40, 41 and 42 of the carrier member 12. The actuation of the grip head 11 for such a completion of the pulling or stretching operation on the workpiece 13, can be produced by an actuation of the power cylinder devices of the carrier member 12 so as to produce either a translatory movement of the grip head relative to the carrier member or a combined translatory and tilting movement of the grip head relative to the carrier member.

The provision of the power cylinder devices on the carrier member 12 as a means for completing a pulling or stretching operation being performed on the work sheet 13, is an important advantage in a chuck mechanism because it permits the desired pulling or stretching of the work sheet to be completed in one operation and eliminates the need for re-chucking the work sheet in the grip head, as would be necessary where the pulling or stretching movements being supplied to the grip head by the movements of the carriage 87 and the rocker member 86 alone, are insufficient to complete the pulling or stretching operation.

As shown in Figs. 9 and 10, the power cylinder devices 40, 41 and 42 of the carrier member 12 also provide for a relative tilting of the grip head 11 during a pulling or stretching operation being applied to a work sheet 136 and in which it is desirable that one edge of the work sheet, for example, the edge 136a in Fig. 9, be subjected to a greater stretching force than the opposite edge of the sheet. This increased stretching of the edge 136a is produced by an actuation of the power cylinder device 41, or an actuation of the power cylinder devices 40 and 41, while the power cylinder device 42 remains relatively stationary as a fulcrum means for the grip head. Similarly, in Fig. 10, the power cylinder devices 40 and 42 are producing an increased stretching of the edge 136b of the work sheet 136 while the cylinder device 41 remains relatively stationary as a fulcrum means for the grip head.

The work sheets 13, 134 and 135 are usually of a uniform thickness or gauge transversely thereof, although they can be of a tapered thickness, if desired. The work sheet 136 can be of a uniform thickness or gauge transversely thereof, but is usually of a tapered thickness, as shown in Fig. 12, and the relatively thicker edge thereof is the one which is subjected to the increased amount of stretch by the relative tilting of the grip head, as illustrated in Figs. 9 and 10.

To adapt the grip head 11 for use with work sheets of a tapered thickness, such as the work sheet 136, a tapered filler strip 137 see Fig. 13) is located in the recess 16 of the bar 15 beneath the grip strip 138. The tapered filler strip is disposed in the recess 16 with its taper in a reverse arrangement with respect to the taper of the work sheet 136. The filler strip 137 is preferably a segment cut from the end of the tapered-thickness work sheet 136.

When the desired operation on the work sheet 13 has been completed, the chuck mechanism 10 is disengaged from the work sheet by first actuating the chuck cylinders 14 to release the gripping engagement of the grip blocks 18 with the work sheet. The grip head 11 is then moved away from the work sheet by actuation of the cylinder devices 40, 41 and 42 of the carrier member 12, or in case these cylinder devices are already in their retracted position, then by a return movement of the carriage 87 or a return rocking movement of the rocker member 86, or by a combination of some or all of these various movements.

From the foregoing description and the accompanying drawings, it will now be readily understood that this invention provides a novel chuck mechanism which is relatively flexible and is capable of accomplishing numerous important different functions by reason of the tilting movement of its grip head relative to the carrier member, and by reason of the swivel mounting of the grip head which permits such relative tilting and also serves as a force-transmitting connection between the carrier member and the grip head, such that this tilting of the grip head can be accomplished while relatively heavy pulling forces are being applied to the work sheet by the grip head. It will now also be understood that these various movements of the grip head provide for a desired ease or facility in the chucking and un-chucking operations of the grip head with respect to the work sheet, as well as for a desired ease or facility in completing a pulling or stretching operation on a work sheet which could not otherwise be completed within the capacity of a stretch bending machine, or the like, of which this chuck mechanism may form a part, without requiring re-chucking of the workpiece. It will, likewise, be understood that the provision in this novel chuck mechanism for the relative tilting and relative translatory movements of the grip head make possible the application of an increased stretching force to one of the edges of a work sheet or the application of pulling or stretching operations to work sheets having either square or beveled ends, as well as to work sheets of either uniform or tapered thickness.

Although the novel chuck mechanism of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In chuck mechanism, a supporting carriage means having a substantially straight-line movement, a rocker member on said carriage means and rockable relative thereto about a pivot axis extending transverse to said straight-line movement, a carrier member having a projecting portion extending substantially in the direction of said straight-line movement and provided with a bearing surface, means mounting said carrier member on said rocker member for swinging movement relative to the latter about a pivot axis extending transverse to said straight-line movement, a grip head having cooperating gripping elements engageable with a work member to be gripped, means slidable on said bearing surface and supporting said grip head for translatory movement thereof relative to said carrier member, and a reciprocably operable cylinder device having a cylinder member on said carrier member and a piston member connected with said grip head and adapted to cause the relative translatory movement of the latter.

2. In chuck mechanism, a carrier member having a cylinder thereon, a piston rod projecting from said cylinder, a grip head having cooperating gripping elements engageable with a work member to be gripped, means forming a direct pulling-force transmitting swivel connection between said piston rod and said grip head comprising a hollow yoke member having arcuate internal bearing shoulder means and a stem member extending into said yoke member and having an arcuate bearing head in arcuately slidable engagement with said arcuate shoulder means, said yoke member and said stem member constituting a pair of swivel members one of which is connected with said piston rod and the other of which is connected with said grip head, and pivot means associated with said yoke means and providing for swinging of said grip head to positions of angularity relative to the axis of said piston rod.

3. In chuck mechanism for gripping a work sheet or the like to be stretched, a carrier member having thereon a cylinder and a bracket portion projecting therefrom forwardly of said cylinder and provided with a bearing surface, an elongated grip head extending in a direction transverse to the axis of said cylinder, gripping means extending along said grip head and adapted to grip an edge portion of said work sheet, a piston rod projecting from said cylinder, and means forming a direct pulling-force transmitting swivel connection between said piston rod and said grip head comprising a hollow yoke member having arcuate internal bearing shoulder means and a stem member extending into said yoke member and having an arcuate bearing head in arcuately slidable engagement with said arcuate shoulder means, said yoke member being slidable on said bearing surface and said yoke member and said stem member constituting a pair of swivel members one of which is connected with said piston rod and the other of which is connected with said grip head.

4. In chuck mechanism for gripping a work sheet or the like to be stretched, a carrier member having thereon a cylinder and a bracket portion projecting therefrom forwardly of said cylinder and provided with a bearing surface, an elongated grip head extending in a direction transverse to the axis of said cylinder, means supporting said grip head and having sliding movement on said bearing surface, gripping means extending along said grip head and adapted to grip an edge portion of said work sheet, a piston rod projecting from said cylinder, yoke means forming a direct force-transmitting connection between said piston rod and said grip head for causing said sliding movement, and pivot means associated with said yoke means and providing for swinging of said grip head to positions of angularity relative to the axis of said cylinder.

5. In chuck mechanism for gripping a work sheet or the like, a carrier member having a projecting portion provided with bearing means, a power cylinder device on said carrier member, a grip head elongated in a direction transverse to the axis of said cylinder device, gripping means on said grip head and extending therealong and adapted to grip or release an edge portion of the work sheet, mounting means slidably mounting said grip head on said bearing means and connecting an intermediate portion of said grip head with said cylinder device for translatory movement of said grip head by the latter, said mounting means comprising a hollow yoke and a stem extending into said yoke, cooperating arcuate shoulder portions on said yoke and stem and defining a direct force transmitting swivel connection providing for swinging of said grip head to positions of angularity relative to the axis of said cylinder device, and grip head swinging devices on said carrier on opposite sides of said cylinder device and connected with said grip head.

6. Chuck mechanism as defined in claim 5 in which said grip head swinging devices are power cylinder devices having piston rods flexibly connected with said grip head.

7. In chuck mechanism for gripping a work sheet or the like, a carrier member having a forwardly projecting bracket provided with a bearing surface, a power cylinder on said carrier member, a piston rod projecting from said cylinder, yoke means connected with said piston rod and slidable on said bearing surface, an elongated grip head extending in a direction transverse to the axis of said cylinder, gripping means on said grip head and extending therealong and adapted to grip or release an edge portion of the work sheet, said grip head being supported at an intermediate point thereof by said yoke means and being swingable to positions of angularity relative to the axis of said cylinder, and cooperating arcuate shoulder portions forming a force-transmitting connection between said yoke means and said grip head.

8. In chuck mechanism for gripping a work sheet or the like, a carrier member having a forwardly projecting bracket provided with a bearing surface, a power cylinder on said carrier member, a piston rod projecting from said cylinder, a yoke connected with said piston rod and slidable on said bearing surface and having a forwardly projecting arm, a grip head having gripping means thereon adapted to grip said work sheet, pivot means connecting said grip head with said arm for swinging of said grip head about the axis of said pivot means and to positions of angularity relative to the axis of said cylinder, said yoke having a bearing recess therein extending arcuately on a radius from the axis of said pivot means, and a rearwardly extending arcuate bearing head connected with said grip head and arcuately slidable in said bearing recess during said swinging of the grip head.

9. In chuck mechanism for gripping a work sheet or the like, a carrier member having a forwardly projecting bracket provided with a bearing surface, a main power cylinder on said carrier member, a piston rod projecting from said main cylinder, yoke means connected with said piston rod and slidable on said bearing surface, an elongated grip head extending in a direction transverse to the axis of said main cylinder, gripping means on said grip head and extending therealong and adapted to grip or release an edge portion of the work sheet, said grip head being supported at an intermediate point thereof by said yoke means and being swingable to positions of angularity relative to the axis of said main cylinder, cooperating arcuate bearing portions forming a force transmitting connection between said yoke means and said grip head and having arcuate relative sliding movement during the swinging of said grip head, said grip head being movable forwardly and backwardly relative to said carrier member by actuation of said main power cylinder, and a pair of other power cylinder devices on said carrier member on opposite sides of said main power cylinder and having operative connection with said grip head for imparting said swinging movement thereto.

10. In chuck mechanism of the character described, a reciprocably movable supporting carriage means, a rocker member on said carriage means and rockable relative thereto, said rocker member having a pair of spaced bearing supports thereon, a carrier member, trunnion means mounting said carrier member for swinging movement between said bearing supports, a grip head elongated in the direction of the axis of said trunnion means and having cooperating gripping means extending therealong and engageable with a work member to be gripped, means mounting said grip head on said carrier member for movement therewith during swinging of the carrier member and rocking of said rocker member, said mounting means also providing for movement of said grip head relative to said carrier member by a translatory movement of said grip head to and from a position substantially parallel to the trunnion axis and a swinging movement of said grip head to positions of angularity relative to said trunnion axis, power cylinder means on said carrier member and connected with said grip head and operable to produce said translatory movement of the grip head, and other power cylinder means on said carrier member and connected with said grip head and operable to produce said swinging movement of said grip head.

11. In chuck mechanism of the character described, a supporting carriage means, a rocker member on said carriage means and rockable relative thereto, said rocker member having a pair of spaced bearing supports thereon, a carrier member, trunnion means mounting said carrier member for swinging movement between said bearing supports, a grip head elongated in the direction of the axis of said trunnion means and having cooperating gripping means extending therealong and engageable with a work member to be gripped, means mounting said grip head on said carrier member for movement therewith during swinging of the carrier member and rocking of said rocker member, said mounting means also providing for movement of said grip head relative to said carrier member by swinging movements to and from a position substantially parallel with said trunnion axis, said mounting means also providing for translatory movement of said grip head relative to said carrier member while said grip head occupies such parallel and angular positions, and power cylinder devices on said carrier and connected with said grip head and operable to produce said translatory and swinging movements of the grip head.

12. In chuck mechanism of the character described, an elongated grip head having a longitudinal recess therein and a longitudinal access slot communicating with said recess, relatively movable grip elements disposed in and extending along said recess and adapted to grip a work member inserted into said recess through said slot, said grip elements comprising a grip strip and a row of grip blocks movable toward and away from said grip strip, and a pair of insert strips of a relatively hard wear-resistant metal and of an angular leg cross-sectional shape mounted in said grip head and extending longitudinally thereof, said insert strips being disposed with one leg thereof lying within said recess and forming side wall portions of the latter adjacent said slot and with the other leg of said insert strips forming the walls of said slot, said one leg of one of said insert strips being in substantially coextensive engagement with said grip strip and said one leg of the other insert strip being in substantially coextensive engagement with said row of grip blocks.

13. In chuck mechanism for gripping a work sheet of a tapered thickness, an elongated grip head having a longitudinal recess therein, gripping means comprising a grip strip of a substantially uniform thickness therealong extending longitudinally in said recess and a series of grip blocks in said recess and movable relative to said grip strip, and a tapered filler strip adapter in said recess beneath said grip strip, said filler strip having substantially the same taper as said work sheet and comprising a segment cut from said work sheet and being disposed in said recess with its taper in reverse arrangement with respect to the taper of said work sheet.

References Cited in the file of this patent

UNITED STATES PATENTS

| Number | Name | Date |
|---|---|---|
| 333,261 | Shaw | Dec. 29, 1885 |
| 419,885 | Richards | Jan. 21, 1890 |
| 910,959 | Runbeck | Jan. 26, 1909 |
| 1,466,730 | Sanford | Sept. 4, 1923 |
| 1,781,997 | Berezowski | Nov. 18, 1930 |
| 2,123,683 | Oeckl | July 12, 1938 |
| 2,129,774 | Kuhner | Sept. 13, 1938 |
| 2,279,964 | Berliner | Apr. 14, 1942 |
| 2,356,433 | Roesch | Aug. 22, 1944 |
| 2,363,160 | Sundstrom | Nov. 21, 1944 |
| 2,431,173 | Hawkes | Nov. 18, 1947 |
| 2,437,092 | Greene | Mar. 2, 1948 |
| 2,437,131 | Shaw | Mar. 2, 1948 |
| 2,446,089 | Hochreiter | July 27, 1948 |
| 2,553,092 | Hubbert | May 15, 1951 |
| 2,632,493 | Gray | Mar. 24, 1953 |

FOREIGN PATENTS

| Number | Country | Date |
|---|---|---|
| 313,140 | Germany | June 30, 1919 |
| 432,766 | Great Britain | Aug. 1, 1935 |